Jan. 23, 1962 T. SALIS 3,018,317
PROTECTIVE DEVICE
Filed July 25, 1958

INVENTOR
THEODORE SALIS
BY Raymond W. Cotton
ATTORNEY 3,018,317
PROTECTIVE DEVICE
Theodore Salis, 3115 S. Llewellyn, Dallas, Tex.
Filed July 25, 1958, Ser. No. 751,034
5 Claims. (Cl. 136—181)

This invention relates to a protective device particularly intended to prevent the adverse corrosive effects ordinarily encountered with storage batteries of the acid-type.

The damage to battery supports, cables, terminals and portions of the batteries themselves is well known to automobile owners. Such damage is not only costly but often renders a vehicle inoperative when it is sorely needed.

There have been many efforts in the past to eliminate and control these adverse effects, but there has never been a solution comparable with that contemplated by this invention. In accordance with the present invention, a protective device can be snapped onto a battery post or posts without removing any terminals, whereupon the corrosive effects will be borne by the protective device which is relatively inexpensive and therefore expendable.

Protective devices contemplated by the present invention comprise an insulating body impervious to battery acid bifurcated at one end to define a pair of resilient jaws adapted to yieldably embrace a battery terminal, and a metal electrode subject to battery acid corrosion secured to the body remote from the jaws. The insulating body is preferably composed of a plastic material and the electrode is preferably copper. The electrode may be secured to the insulating body by one or more rivets and the electrode preferably has a flange engaging a surface of the body and another flange inclined thereto.

A more complete understanding of the invention will follow from a description of the accompanying drawings wherein.

Figure 1:
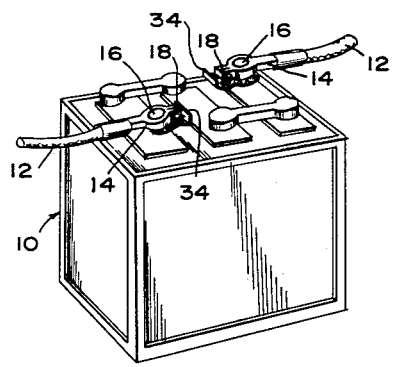
FIG. 1 is a perspective view of a battery to which protective devices of the type contemplated by the present invention have been applied.
Figure 2:
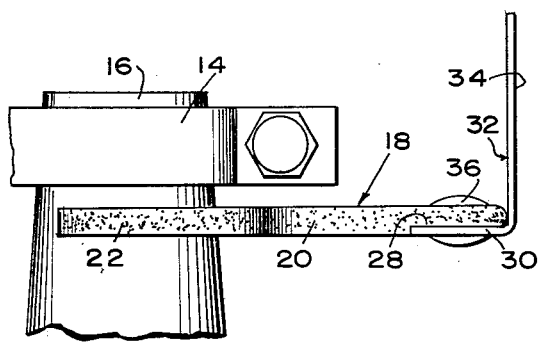
FIG. 2 is a fragmentary elevation on a somewhat enlarged scale depicting one of the protective devices applied to a battery post below its terminal.
Figure 3:
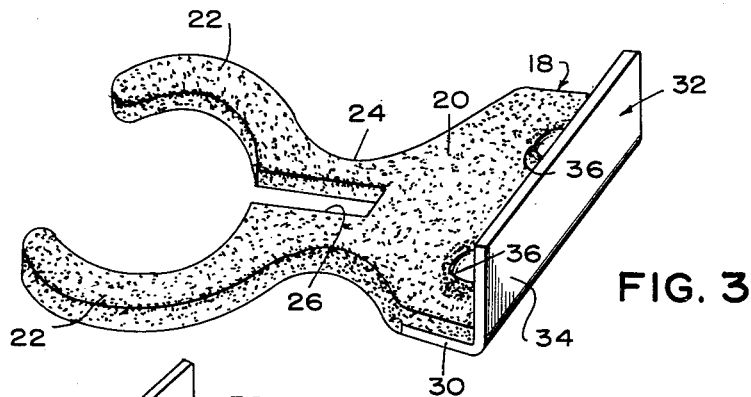
FIG. 3 is a perspective view of the protective device of FIG. 2 looking downwardly from one end.
Figure 4:
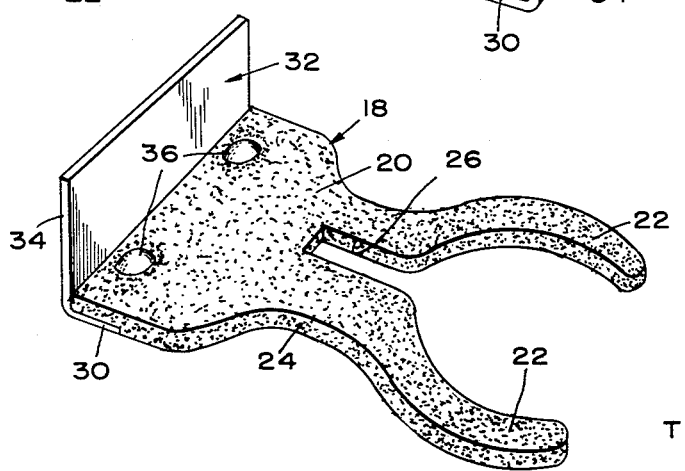
FIG. 4 is a perspective view of the protective device of FIG. 2 looking downwardly from the other end.

A storage battery 10 of the conventional type used in automobiles has been depicted in FIG. 1 as having cables 12 connected by terminals 14 to its posts 16. Removably secured to each post 16 below its terminal 14, a protective device 18 embodying the present invention has been depicted. The protective device 18 comprises a unitary body 20 impervious to battery acid and bifurcated at one end to define a pair of resilient jaws 22 adapted to yieldably embrace the battery post 16. The reduced neck portion 24 of the insulating body contains a central slot 26 to assure proper degrees of yieldability and resilience to the jaws 22 so that they will retain their positions on the battery post after the device has been snapped into place. The end of the insulating body 20 remote from the jaws 22 is provided with a recess 28 for the reception of a flange 30 of an angular electrode 32 whose other flange 34 is inclined to the first at approximately a right angle. The electrode is shown as secured to the body 18 by means of rivets 36.

The insulating body may be composed of a variety of materials so long as they are impervious to the battery acid, usually sulphuric acid, and at the same time sufficiently resilient to assure the desired clamping action of the jaws about the battery post. By its very nature, the protective device must be readily applicable to and removable from the battery post and yet remain in position until removal is intended. By virtue of the open jaws, the protective device can be applied to the battery post without removing the terminal. Various plastic materials capable of being stamped or molded to the form required are contemplated. Plastic bodies containing polyethylene, rubber compositions and many others suggest themselves for the purpose. The electrode may be composed of a metal which is subject to attack by the battery acid, copper and its alloys suggesting themselves as eminently suited for the purpose.

Whereas only one specific form of the invention has been described with reference to the accompanying drawings, variations falling within the scope of the appended claims are contemplated as well.

I claim:

1. A protective device comprising an insulating body impervious to battery acid bifurcated at one end to define a pair of resilient jaws adapted to yieldably embrace a battery terminal, and a metal electrode subject to battery acid corrosion secured to said body remote from said jaws to shield said terminal from battery acid.

2. A protective device as set forth in claim 1 wherein said body is composed of a plastic material.

3. A protective device as set forth in claim 1 wherein said electrode is copper.

4. A protective device as set forth in claim 1 wherein said electrode is secured to said body by a rivet.

5. A protective device as set forth in claim 1 wherein said electrode has a flange engaging a surface of said body and another flange inclined thereto.

References Cited in the file of this patent
UNITED STATES PATENTS
2,013,219    Peterson _____ Sept. 3, 1935